United States Patent [19]

Bauer

[11] Patent Number: 5,400,143
[45] Date of Patent: Mar. 21, 1995

[54] COMPACT LASER INTERFEROMETER SYSTEM

[75] Inventor: Robert J. Bauer, Nederland, Colo.

[73] Assignee: Ball Corporation, Muncie, Ind.

[21] Appl. No.: 11,365

[22] Filed: Jan. 29, 1993

[51] Int. Cl.[6] .............................................. G01B 9/02
[52] U.S. Cl. ..................................... 356/351; 356/349
[58] Field of Search ........................ 356/351, 349, 352

[56] References Cited

U.S. PATENT DOCUMENTS

| | | | |
|---|---|---|---|
| 3,551,055 | 12/1970 | Chitayat | 356/108 |
| 3,612,694 | 10/1971 | Mottier et al. | 356/110 |
| 3,844,638 | 10/1974 | Lingenfelder et al. | 350/171 |
| 3,955,083 | 5/1976 | Collins et al. | 250/231 |
| 4,188,122 | 2/1980 | Massie et al. | 356/349 |
| 4,681,448 | 7/1987 | Wertz | 356/352 |
| 4,693,605 | 9/1987 | Sommargren | 356/349 |
| 4,787,747 | 11/1988 | Sommargren et al. | 356/349 |
| 4,802,764 | 2/1989 | Young et al. | 356/349 |
| 4,802,765 | 2/1989 | Young et al. | 356/349 |
| 4,807,997 | 2/1989 | Sommargren | 356/349 |
| 4,859,066 | 8/1989 | Sommargren | 356/349 |
| 4,881,815 | 11/1989 | Sommargren | 356/349 |
| 5,270,793 | 12/1993 | Chour et al. | 356/349 |

*Primary Examiner*—Samuel A. Turner
*Assistant Examiner*—LaCharles P. Keesee
*Attorney, Agent, or Firm*—Gilbert E. Alberding

[57] ABSTRACT

An optical interferometer system is described which precisely measures the angle of rotation of a mirrored surface about a desired axis of rotation without sensitivity to rotation of the surface about an axis perpendicular to the desired axis of measurement. Measurements of the angle or position of a surface are made without attaching any optical or other components to the surface. In operation, a laser beam is passed through a beam splitter which provides two secondary beams. Each of the beams is then passed through a respective optical assembly, each of which is essentially a mirror image of the other. Each of the optical assemblies comprises a unique combination and arrangement of optics which provides a folded optical path wherein the laser beam passes through the system optics and is reflected multiple times by the mirror being measured. Each of the beams then passes back through its respective optical section and is detected by optical means. Each section of the optical assembly includes a "mid-path assembly" comprising a penta-prism/right-angle prism optically coupled to a retro-reflector. This mid-path assembly cancels out the effects of any off-axis movement of the surface being measured and provides accurate measurements even when the surface is rotated orthogonally to the plane of rotation of the desired measurement.

32 Claims, 7 Drawing Sheets

COMPACT LASER INTERFEROMETER SYSTEM

FIELD OF THE INVENTION

This invention relates generally to optical interferometers, and in particular, to a compact laser interferometer which measures the angle of a light-reflecting planar surface relative to a reference plane without requiring any components to be physically attached to the surface being measured.

PROBLEM

It is a problem in the area of laser interferometry to accurately measure the angle or position of a surface, such as that of a telescope mirror, without attaching an optical component to the mirror or interfering with the mirror suspension or positioning mechanisms. There exist position measurement devices which are not attached to the surface to be measured, such as capacitive sensors or differential impedance transducers. These devices, however, generally have a limited working range and must be positioned close to the surface to be measured. In addition, capacitive sensors and differential impedance transducers have limited resolution as well as limited bandwidth. Conventional optical position sensing encoders must be coupled directly to the surface being measured through a shaft that may twist during movement of the surface. Twisting of the coupling shaft results in inaccurate measurements.

Another problem with conventional angle or position measurement devices is that they may fail to function when the surface being measured is rotated in a plane which is orthogonal to the plane of rotation in which the measurement is desired to be made.

Conventional position measurement interferometers also require relatively precise alignment of both the measurement surface and a reference mirror with respect to the interferometer optics.

A further problem with conventional sensing devices which use dual frequency heterodyne techniques is that they provide inherently less resolution and lower bandwidth than a single frequency device. In addition, the lower processing frequency of heterodyne techniques results in further loss in resolution as compared to devices which provide fringe information at shorter, optical wavelengths.

SOLUTION

The present interferometer system overcomes the foregoing problems and achieves an advance in the art by providing a system which precisely measures the angle of rotation of a mirrored surface about a desired axis of rotation without sensitivity to rotation of the surface about an axis perpendicular to the desired axis of measurement. The interferometer system makes measurements of the angle or position of a surface, such as that of a telescope mirror, without attaching any optical or other components to the mirror or interfering with the mirror suspension or positioning mechanisms. The interferometer system provides differential measurements, i.e., measurements which are sensitive only to the difference in the path travelled by a first light beam relative to one part of a measurement surface and the path of a second light beam relative to another part of the measurement surface (or a reference surface). Measurements made by the interferometer system are therefore insensitive to the absolute displacement of the interferometer from the surface being measured.

In operation, a laser beam is passed through a beam splitter which provides two secondary beams. Each of the beams is then passed through a respective optical section of the interferometer system. Each of the two optical sections is a mirror image of the other, with the exception that the beam exiting one of the sections is circularly polarized. Each of the optical sections comprises a unique combination and arrangement of optics ("optical assembly") which provides a folded optical path wherein the laser beam passes through the system optics and is reflected multiple times by the mirror being measured. Each of the beams then passes back through its respective optical section and is detected by optical means. The relative phase of the two beams is then determined to measure the relative change in distance of the optical paths of the two beams and hence the amount of rotation of the mirror about a given axis.

The present optical assembly makes the interferometer system lighter and more compact than conventional interferometers. The folded optical path also provides greater resolution than a single reflective path due to the extra distance travelled by the light beam. Each section of the optical assembly includes a "mid-path assembly" comprising a penta-prism/right-angle prism optically coupled to a retro-reflector. This mid-path assembly cancels out the effects of any off-axis movement of the surface being measured and provides accurate measurements even when the surface is rotated orthogonally to the plane of rotation of the desired measurement.

The interferometer system can also be used to measure linear displacement of a surface by using a "reference mirror" and a "displacement mirror", which is attached to the surface whose displacement is being measured. An advantage of the present system is that it reduces the alignment requirements of both mirrors due to the ability of the system to tolerate off-axis light beams.

The present interferometer system makes measurements using a single frequency laser and optical detectors. Single frequency optical detection coupled with the unique optical assembly provides significantly higher resolution than conventional laser interferometers.

Two alternative embodiments are also disclosed, each of which requires fewer optical components than the principal embodiment.

Specific applications include:

(1) modal analysis, wherein multiple sensor heads are used in conjunction with target mirrors to measure the dynamic behavior of structures;

(2) accelerometer and seismometer devices, wherein the interferometer system is used to detect the motion of a suspended mass;

(3) linear position measurement and control devices using differential measurement;

(4) direct writing applications in integrated circuit fabrication;

(5) topography mapping;

(6) attitude sensing and position control of satellites; and (7) optical shaft angle encoding.

BRIEF DESCRIPTION OF THE DRAWING

The invention may be better understood from a reading of the following description thereof taken in conjunction with the drawing in which.

DETAILED DESCRIPTION OF THE INVENTION

Basic Theory of Operation

An optical interferometer is a device which is used to measure changes in the relative lengths of two optical paths. These two optical paths are typically the path between an observer and a reference surface, and the path between the observer and a measurement surface. A measured change in the relative length of the two optical paths is used to provide information which can then be used to calculate the amount of displacement and the direction of displacement of the measurement surface relative to a fixed plane.

In operation, a typical prior art interferometer uses a single light source which is split into two secondary light beams, one of which is transmitted toward the reference surface, and the other of which is transmitted toward the measurement surface. The present invention transmits both secondary beams toward the measurement surface to effect a differential measurement of two points on the measurement surface. In both cases, the two secondary light beams are then reflected from the respective surfaces or points and combined to form an interference pattern comprising a plurality of "fringes" which appear to the observer as a series of adjacent light and dark bands of light. This interference pattern is caused by the constructive and destructive addition of the peaks and valleys (i.e., the relative wave amplitudes) of the two light beams. When the peaks (and thus also the valleys) in both beams coincide, the interference fringe at a given point is relatively bright, due to constructive interference between the two beams. When a peak in one of the beams coincides with a valley in the other beam, the interference fringe at that point is relatively dark, due to destructive interference between the two beams. When the optical path length of one of the two secondary beams changes relative to the length of the other beam, these interference fringes move with respect to a fixed observation point. By observing a fringe shift from dark to light (and vice-versa), the most elementary interferometer can detect a half-wavelength shift in the relative length of the two beams, and hence can detect a movement of the measurement surface (relative to the reference surface) of a distance equal to a half wavelength of the light source. The present invention allows even greater measurement resolution, due to the novel combination of optics employed therein.

Embodiment Using Two Sense Head Assemblies

Figure 1:
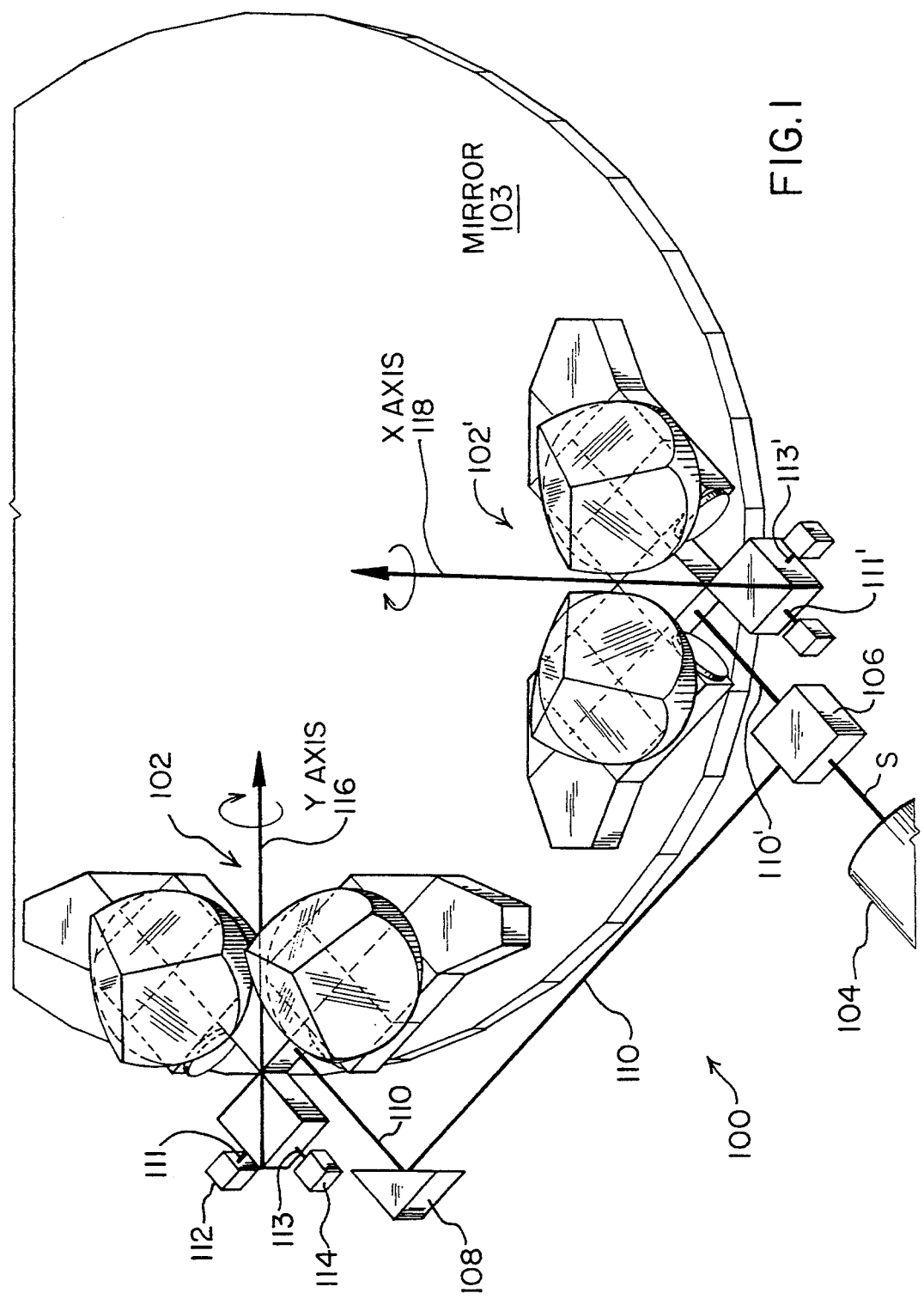
FIG. 1 illustrates two interferometric angle measurement heads in close proximity to the surface of a mirror.

FIG. 1 illustrates one possible exemplary embodiment of an interferometer system 100 comprising two interferometric angle sense head assemblies 102, 102' in close proximity to the surface of a mirror 103 whose angular motion is to be measured (hereinafter referred to as the "measurement surface" 103). Each sense head assembly 102, 102' further comprises two substantially mirror image optical assemblies and is described in detail below. Both sense head assemblies 102, 102' are provided with a monochromatic, linearly polarized, collimated light source S from laser 104. Light source S enters beam splitter 106 where it is split into input beams 110 and 110'. Input beam 110 is reflected by right angle mirror or prism 108 into sense head assembly 102. Sense head assembly 102 uses input beam 110 to determine the rotation of measurement surface 103 about "Y" axis 116, and sense head assembly 102' uses input beam 110' to determine the rotation of measurement surface 103 about "X" axis 118.

Each sense head assembly 102, 102' provides two output beams 111, 113 and 111', 113', respectively. Beams 111 and 113 have an interference fringe phase relationship of 90 degrees, as do beams 111' and 113'. Beams 111 and 111' are detected by optical detectors 112 and 112', respectively. Beams 113 and 113' are detected by optical detectors 114 and 114', respectively. The outputs (not shown) from optical detectors 112, 112', 114, and 114' are analyzed by well-known phase detection methods to determine the angle of the measurement surface 103 with respect to the mirror's "X" axis 118 and "Y" axis 116.

Sense Head Assembly

Figure 2:
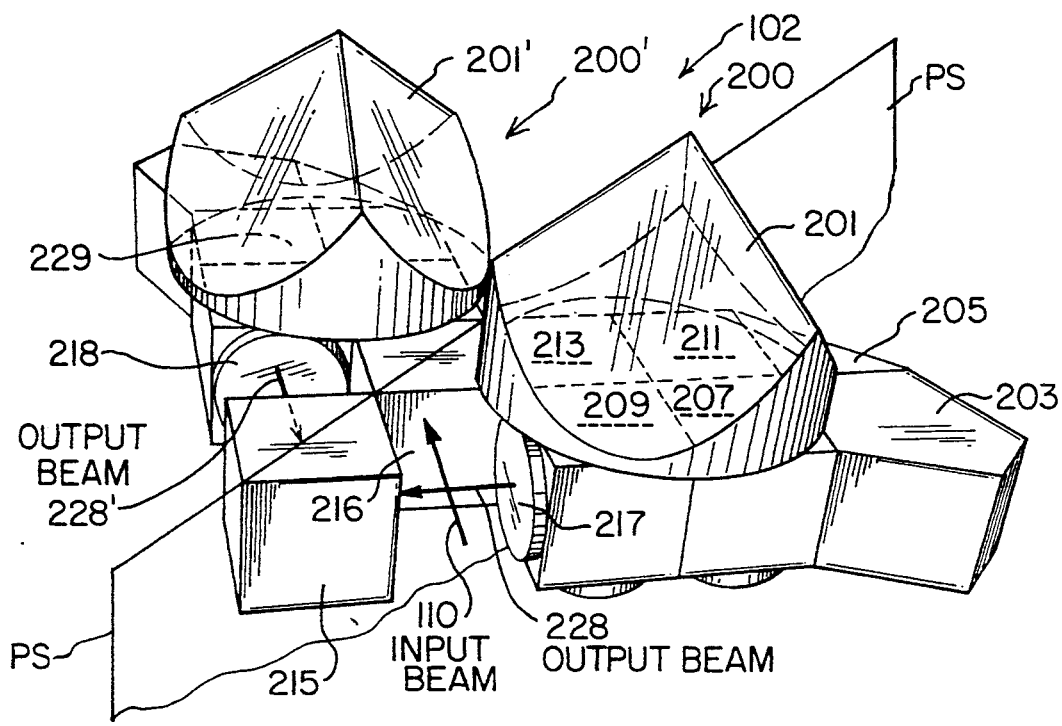
FIG. 2 is a cut-away top front isometric view showing the components of a sense head assembly.
Figure 3:
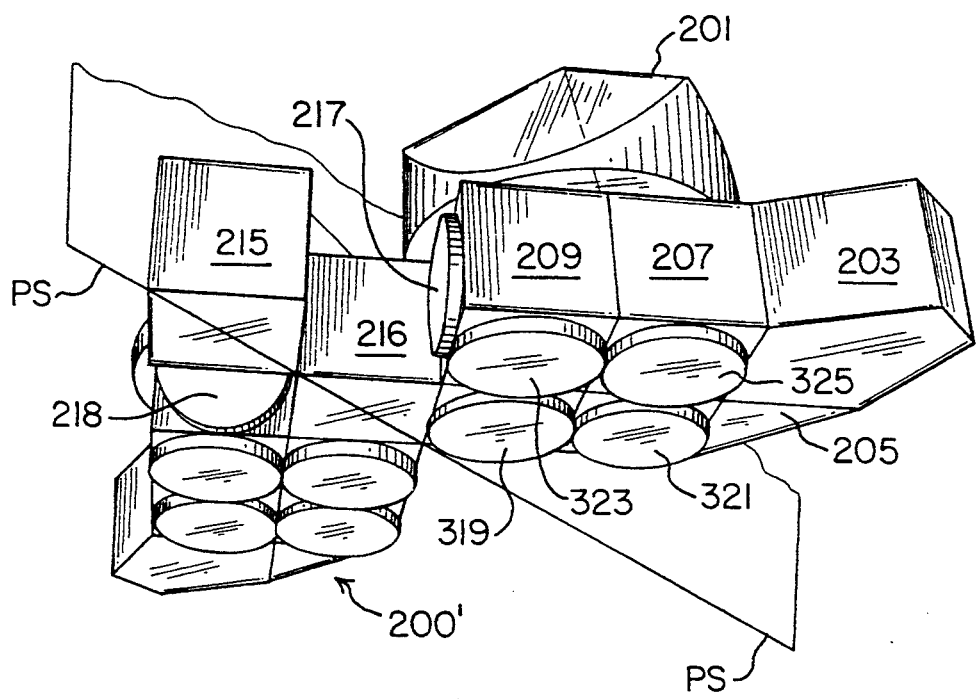
FIG. 3 is a bottom front isometric view showing the components of a sense head assembly.
Figure 4:
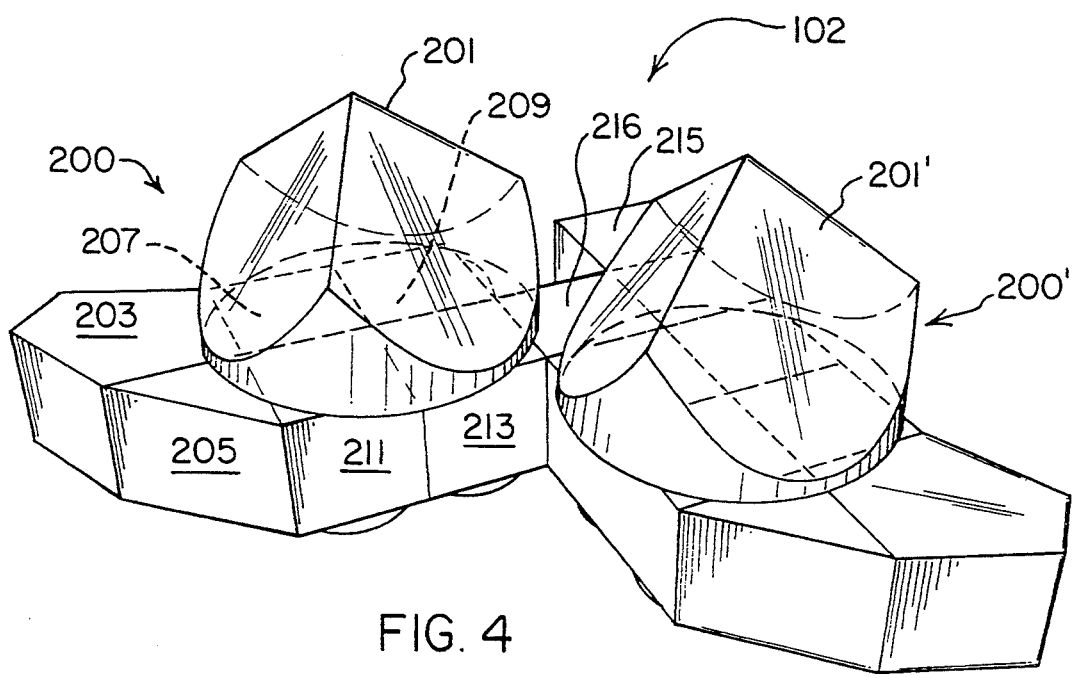
FIG. 4 is a top rear isometric view showing the components of a sense head assembly.

FIG. 2 is a cut-away top front isometric view showing the components of a sense head assembly 102, and FIG. 3 is a bottom front isometric view showing the components of a sense head assembly 102. FIG. 4 is a top rear isometric view showing the same components of sense head assembly 102 shown in FIGS. 2 and 3. As shown in FIGS. 2 and 3, sense head assembly 102 comprises a right side optical assembly 200 and a left side optical assembly 200'. The location of the components of each side 200, 200' is symmetrical about a plane of symmetry PS. Therefore, only the right side optical assembly 200 of sense head assembly 102 is described in detail below. Right side optical assembly 200 comprises four polarizing beam splitters 207, 209, 211, 213, four quarter wave retardation plates 319, 321, 323, 325, a penta-prism 203, a right angle prism 205, a retro-reflector 201, and an exit wave plate 217.

As shown in FIG. 2, non-polarizing beam splitter 216 is located adjacent to polarizing beam splitter 215. Both beam splitters 215, 216 are positioned so that their reflective planes are coincident with the plane of symmetry PS of sense head assembly 102. Beam splitter 215 is used to "mix" beams 228 and 228' so that they interfere with each other, and therefore is hereinafter referred to as beam mixer 215. Polarizing beam splitter 213 is located so that it has a left side adjacent to the right side of beam splitter 216. Polarizing beam splitters 207, 209, 211, and 213 are arranged so that they share a common edge with each other to form a rectangle when viewed from above or from the side.

An important and novel aspect of the present invention is a "mid-path" assembly consisting of a penta-prism 203 optically coupled to a right angle prism 205. This mid-path assembly 203, 205 provides for canceling unwanted translation of measurement beam 501 when the motion of the measurement surface 103 is about an axis perpendicular to the desired axis of measurement. Penta-prism 203 has a left side located adjacent to beam splitter 207, and a rear side located adjacent to right angle prism 205.

Retro-reflector 201 is located directly above and in contact with beam splitters 207, 209, 211, and 213. As shown in FIG. 3, quarter wave retardation plates 319, 321, 323, and 325 are located adjacent to and in contact with beam splitters 213, 211, 209, and 207, respectively. Each beam splitter/quarter wave retardation plate pair may also be referred to as a transmitting/reflecting assembly, since this pair of components either transmits or reflects incident light, depending on the polarization of the light. It should also be noted that all four quarter wave retardation plates 319, 321, 323, and 325 could be combined into a larger single plate to accomplish the desired polarization functions.

Input beam 110 (whose path is described in detail in FIG. 5 below) enters both right side optical assembly 200 and left side optical assembly 200' via beam splitter 216. After being processed, measurement beam 518 exits right side optical assembly 200 through exit wave plate (quarter wave retardation plate) 217, which is adjusted to provide circular polarization, whereafter it enters beam mixer 215.

The components of the left side optical assembly 200' of sense head assembly 102 are located in mirror image fashion with respect to the right side optical assembly 200 of sense head assembly described above. However, exiting measurement beam 518' is transmitted through exit wave plate 218 before entering beam mixer 215. Exit wave plate 218 is a half wave retardation plate instead of a quarter wave retardation plate as used on the right side optical assembly 200 of sense head assembly 102. This half wave retardation plate is adjusted to impart a 45 degree linear polarization to the exiting measurement beam 518' so that it will properly interfere with the circularly polarized measurement beam 518 exiting from the right side optical assembly 200 of sense head assembly 102.

In an exemplary embodiment, all of the optics used in sense head assembly 102 (except for retro-reflector 201) are standard 10 millimeter optical components. Retro-reflector 201 is a standard 25 millimeter component.

Figure 5:
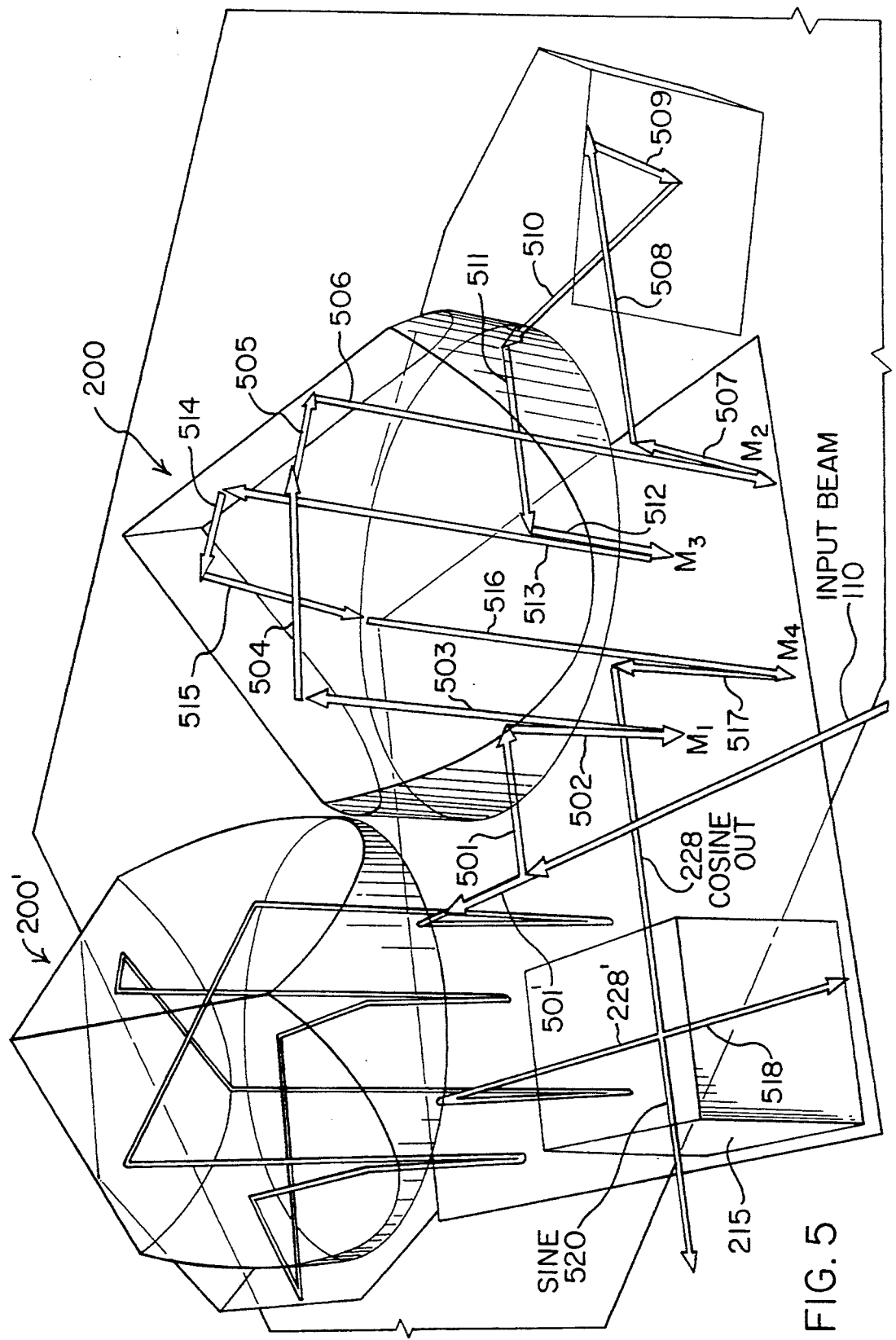
FIG. 5 is a ray diagram of the interferometer system.

FIG. 5 is a ray diagram of the interferometer system. FIG. 5 is best described with reference to both FIGS. 2 and 3. Input beam 110 is generated by laser 104 and is a monochromatic, linearly polarized, collimated light beam of circular cross-section. Input beam 110 intersects non-polarizing beam splitter 216 which reflects approximately 50% of the beam as measurement beam 501 and transmits approximately 50% of the beam as measurement beam 501'. The behavior of measurement beam 501, as it travels through sense head assembly right side optical assembly 200 is described in the following paragraphs. Measurement beam 501' follows a mirror image path in sense head optical assembly left side 200'.

After being reflected from beam splitter 216, measurement beam 501 intersects the reflecting plane of polarizing beam splitter 213. Input beam 110 polarization has been adjusted for maximum reflection at this beam splitter 213 by manually rotating laser 104. Beam 501 is reflected off of beam splitter 213 to become beam 502. Beam 502 is directed down toward the mirror surface 103 to be measured. Beam 502 passes through quarter wave retardation plate 319 which is adjusted so as to convert the linearly polarized beam 502 to circular polarization. Beam 502 then strikes mirror measurement surface 103 at $M_1$ where it becomes beam 503. Beam 503 is reflected back toward optical assembly 200. This reflection process reverses the direction of rotation of the circularly polarized light. Beam 503 then passes through quarter wave retardation plate 319 again. Quarter wave retardation plate 319 converts the light back to linearly polarized light. Because the direction of the rotation of the circular polarization was reversed, the resulting linear polarization is at right angles to the original beam 502 passing through quarter wave retardation plate 319. Because the polarization of beam 503 is now at right angles to the original beam 502, beam 503 passes through polarizing beam splitter 213. Beam 503 then enters retro-reflector 201. Beam 503 is reflected three times inside retro-reflector 201, becoming beam 504 after the first reflection, beam 505 after the second reflection and emerging on the opposite side of retro-reflector 201 as beam 506. Beam 506 enters polarizing beam splitter 207. The polarization of the beam 506 is reversed due to the three reflections caused by retro-reflector 201. Beam 506 therefore passes through polarizing beam splitter 207 without being reflected. By a process similar to that described above, beam 506 passes through quarter wave retardation plate 325, is reflected from measurement surface 103 at $M_2$, and then reflected as beam 507 by polarizing beam splitter 207 as beam 508. Beam 508 passes through penta-prism 203, where it is reflected twice as beams 509 and 510, respectively. Beam 510 enters right-angle prism 205, where it is reflected as beam 511. Beam 511 then enters polarizing beam splitter 211, and because of the polarization orientation, is reflected toward measurement surface 103 as beam 512. Again, by the same quarter wave retardation plate/reflection process described above, beam 512 passes through quarter wave retardation plate 321 and is reflected from measurement surface 103 as $M_3$ to become beam 513. Beam 513 passes back through quarter wave retardation plate 321 and then through polarizing beam splitter 211. Beam 513 then again enters retro-reflector 201. Beam 513 is then reflected three times inside retro-reflector 201 as represented by beams 514, 515, and 516, respectively. After these three reflections, beam 516 emerges on the opposite side of retro-reflector 201 and enters polarizing beam splitter 209. The polarization of beam 516 is now reversed from the polarization of the beam 513 that entered the retro-reflector. Beam 516 thus passes through polarizing beam splitter 209 without being reflected. Again, by the quarter wave retardation plate/reflection process, beam 516 passes through quarter wave retardation plate 323. Beam 516 is reflected from measurement surface 103 at $M_4$ to become 517. Beam 517 re-enters polarizing beam splitter 209 after passing back through quarter wave retardation plate 323. Beam 517 is reflected by beam splitter 209 to become beam 228. Beam 228 then passes through half-wave retardation plate 217. Half-wave retardation plate 217 is adjusted to rotate the polarization of beam 228 by 45°. Beam 228 then enters beam mixer 215 where half the intensity of the beam is reflected and half the intensity is transmitted through beam mixer 215 to become beam 520.

The behavior of beam 501' in left side optical assembly 200' is identical to that in right side optical assembly 200 as described above with the following exception. Beam 228' which emerges from left side optical assembly 200' passes through a quarter-wave retardation plate 218 and is converted to circular polarization. Beam 228' then enters beam mixer 215 and interferes with beam 228 from right side optical assembly 200 to become beam 522.

Two output beams 520 and 522 thus emerge from beam mixer 215. Beams 520 and 522 are the result of interference of the beams from the right side optical assembly 200 and left side optical assembly 200' of sense head assembly 102. The phase relationship of the interference fringes created by these two beams is 90°. Therefore, one output beam 520 is called the "sine" output and the other is called the "cosine" output. By transmitting beams 520 and 522 through 45° polarizers (not shown), the fringe patterns are easily detectable in a well-known fashion.

Reduced Component Embodiments

Figure 6:
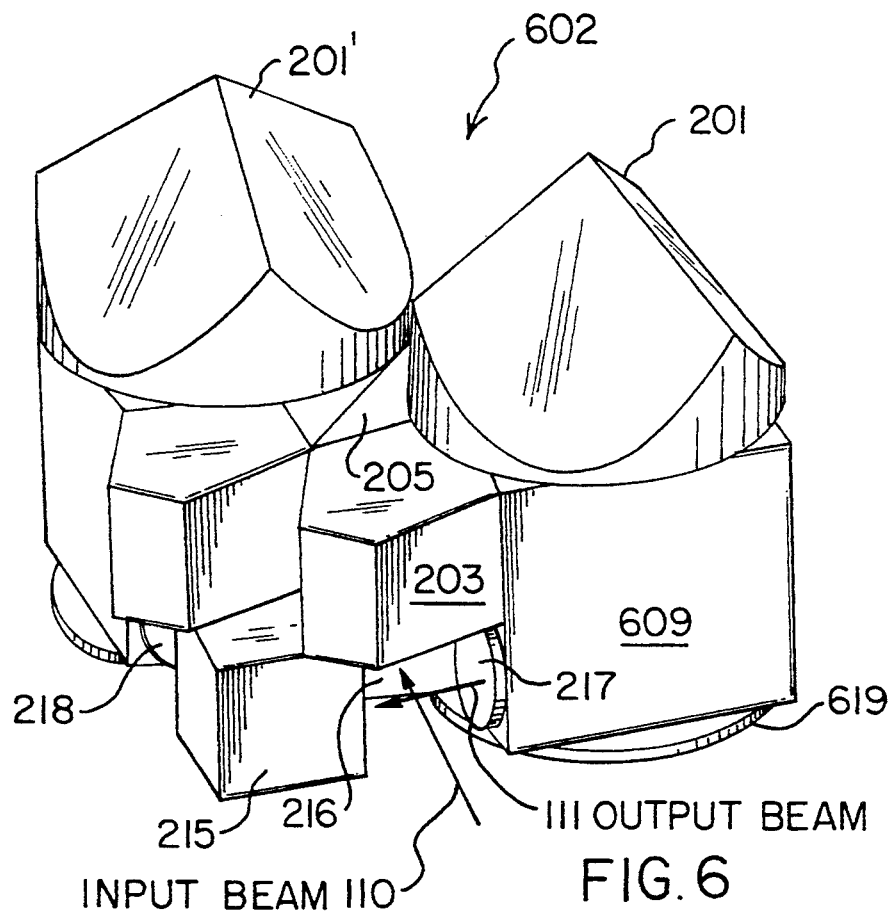
FIGS. 6 and 7 are isometric views of a first alternative embodiment of the present invention.
Figure 7:
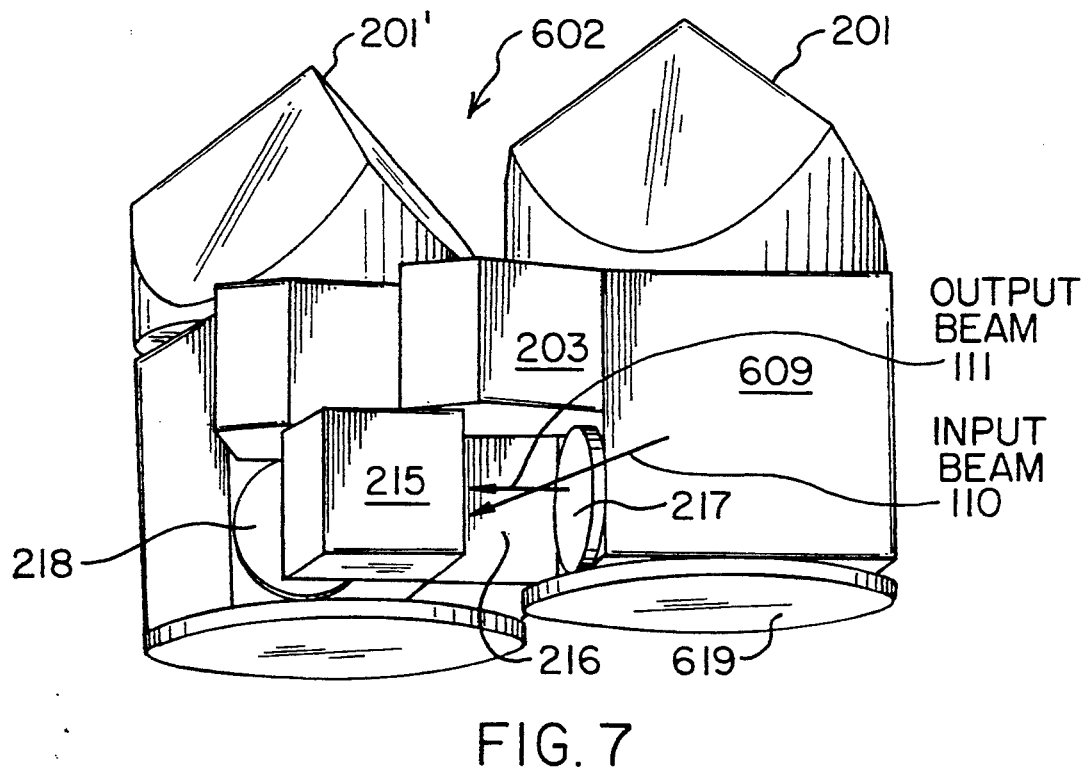

A first alternative embodiment of the present interferometer system uses fewer components than the preceding embodiment. FIGS. 6 and 7 are isometric views of this alternative embodiment. This embodiment functions in analogous fashion to the preceding embodiment, and therefore will be described primarily with respect to differences between the two embodiments.

As shown in FIGS. 6 and 7, sense head assembly 602 comprises two mirror-image sets of optical components, with a common beam splitter 216 and a common beam mixer 215 operative with each set. Only the right hand set of optical components is described herein. The right hand side of sense head assembly 602 includes only a single polarizing beamsplitter 609 (hereinafter referred to as a transmit/reflect assembly 609), which provides the functions of the four polarizing beamsplitters 207, 209, 211, 213 used in the previous embodiment. The present embodiment also uses only a single quarter wave retardation plate on the bottom of transmit/reflect assembly 609, instead of the four quarter wave retardation plates used in the first described embodiment. Retro-reflector 201 and mid-path assembly 203, 205 are both identical to those previously described. Mid-path assembly 203, 205, is however, now located on the front side of the sense head assembly 602.

The optical path of the present embodiment is described as follows. Input beam 110 from laser 104 enters beam splitter 216, where half of the light is reflected into transmit/reflect assembly 609. The light beam is reflected by transmit/reflect assembly 609 through quarter wave retardation plate 619 to the measurement surface (not shown). The light beam reflects off of the measurement surface back through quarter wave retardation plate 619 and is transmitted through transmit/reflect assembly 609 to retro-reflector 201. The light beam is then reflected through transmit/reflect assembly 609 and quarter wave retardation plate 619 to the measurement surface a second time. After being reflected by the measurement surface, the light beam is reflected by transmit/reflect assembly 609 into mid-path assembly 203, 205. After travelling through mid-path assembly 203, 205, the light beam is then reflected off of transmit/reflect assembly 609 back through quarter wave retardation plate 619 onto the measurement surface a third time. After being reflected by the measurement surface, the light beam is then transmitted through back through quarter wave retardation plate 619 and transmit/reflect assembly 609 to retro-reflector 201. The light beam is then reflected and transmitted through transmit/reflect assembly 609 a fourth time, to the measurement surface. The light beam is then reflected toward the transmit/reflect assembly 609 where it is reflected out through quarter wave retardation plate 217 and into beam mixer 215 as output beam 728, where it is then combined with the output beam emerging from half wave retardation plate 218 on the left side of sense head assembly 602. Measurement of the angle of the measurement surface is then performed exactly as described for the previous embodiment.

This reduced component embodiment provides a more limited operating angle range as compared to the preceding embodiment. This reduced angular working range is due to the fact that the beams have an internal path through the optics which has a greater angle of reflection between the transmit/reflect assembly 609 and the retro-reflector 201. This increased reflective angle path reduces the angular excursion over which the interferometer can make measurements.

Figure 10:
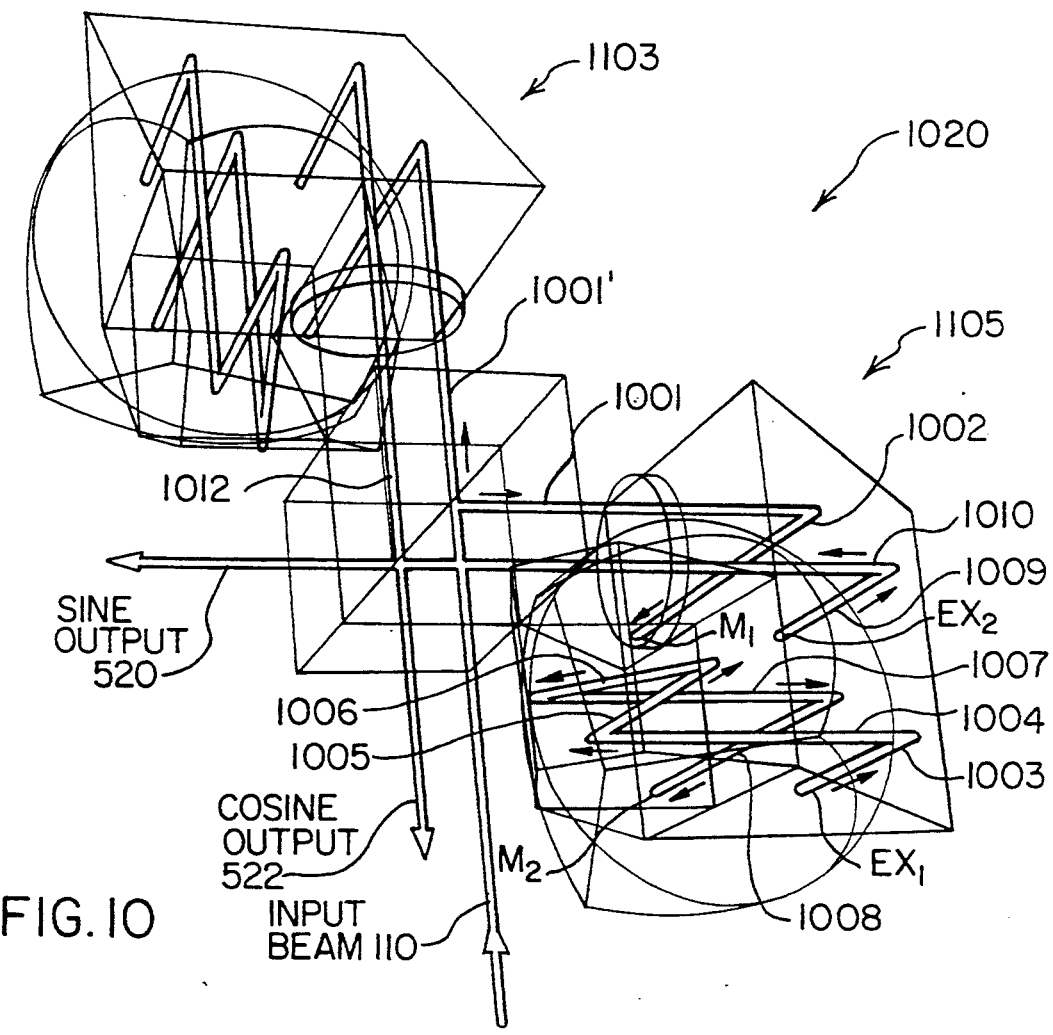
FIG. 10 is a ray path diagram of the second alternative embodiment.
Figure 11:
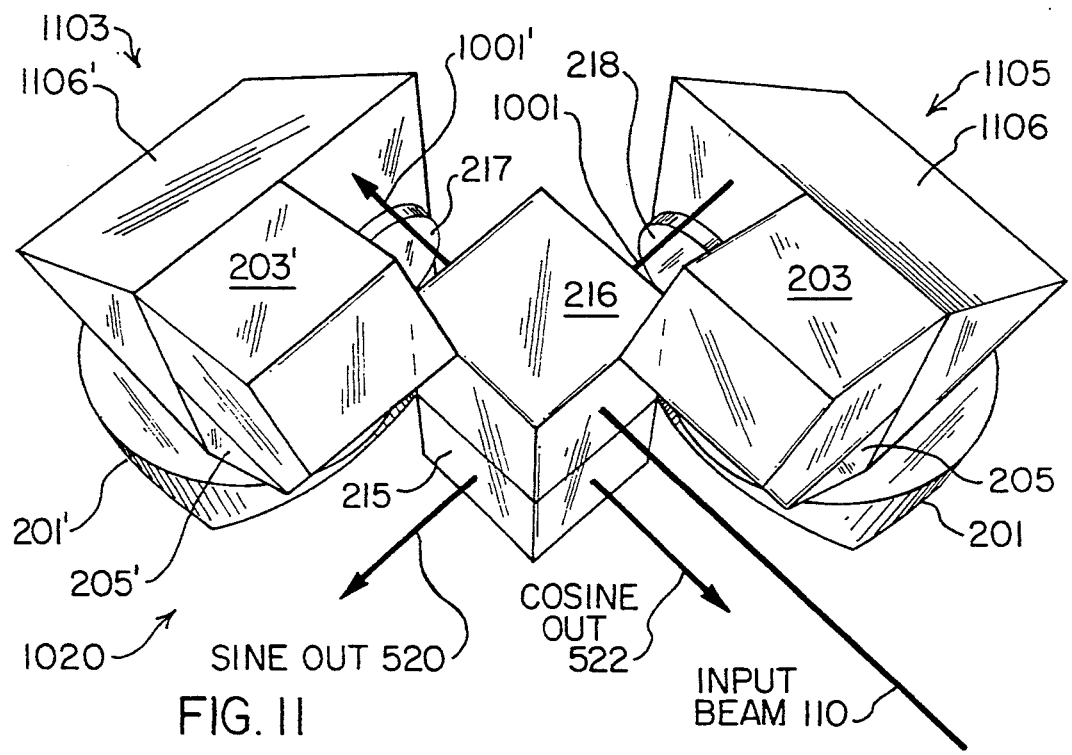
FIGS. 11 and 12 are isometric views of a second alternative embodiment of the present invention.
Figure 12:
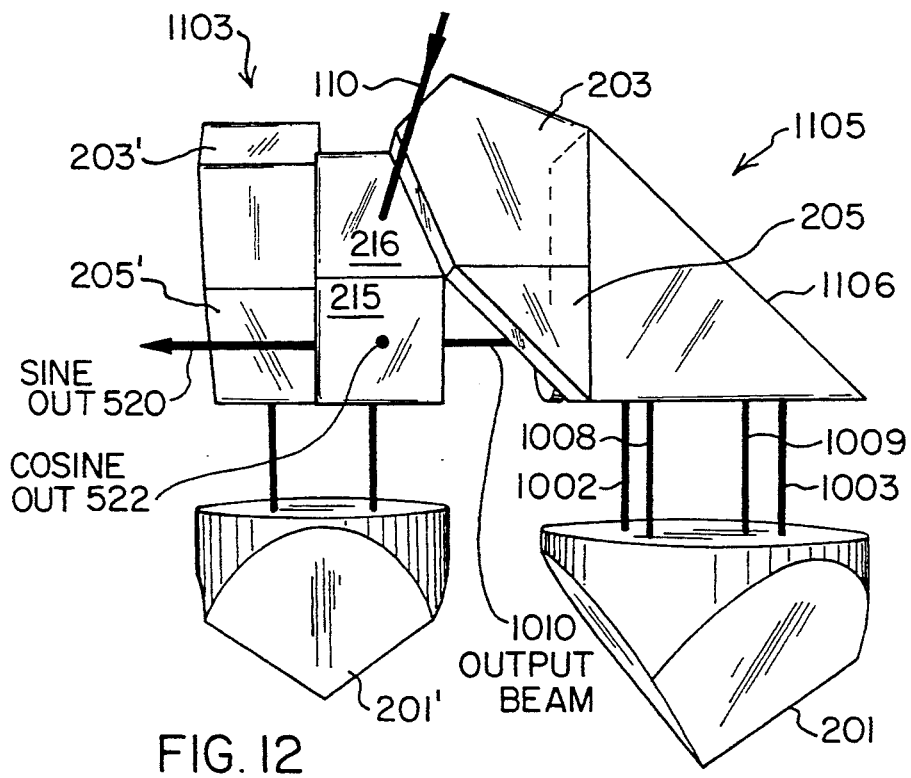

A second alternative embodiment (hereinafter referred to as the "third" embodiment) of the present interferometer system also uses fewer components than either of the first two described embodiments. FIG. 10 is a ray path diagram of the third embodiment. FIGS. 11 and 12 are isometric views of this third embodiment. As shown in FIGS. 11 and 12, sense head assembly 1020 comprises two mirror-image sides 1103, 1105 containing similar optical components. Each side 1103, 1105 shares a common non-polarizing beam splitter 216 and a common polarizing beam mixer 215. Right side 1105 and left side 1103 of sense head assembly 1020 each includes a "mid-path assembly" 203, 205, and 203', 205', respectively, comprising a single penta-prism 203, 203' optically coupled to a small right angle prism 205, 205'. A large right angle beam turning prism 1106, 1106' is optically coupled between each mid-path assembly and corresponding retro-reflectors 201, 201'. This mid-path assembly 203, 205 functions in analogous fashion to the preceding embodiments to cancel out measurement beam translation. Left side 1103 has a quarter wave retardation plate 217 attached to right angle beam turning prism 1106', and right side 1105 has a half wave retardation plate 218 attached to right angle beam turning prism 1106. In this embodiment, retro-reflectors 201 and 201' are attached to the measurement surface (not shown), rather than to the sense head assembly 1020 itself. Note that, in contrast to the first two embodiments described above, this embodiment does not require the use of any transmitting/reflecting assemblies. Large right angle beam turning prisms 1106, 1106' provide an analogous function to that of the transmitting-/reflecting assemblies. The use of these large right beam turning angle prisms 1106, 1106' further simplifies the construction of the interferometer system.

As shown in FIG. 10, input beam 110 from laser 104 enters non-polarizing beam splitter 216 and is split into measurement beams 1001 and 1001'. Since the optical paths in each side 1103, 1105 of sense head assembly 1020 are (mirror image) identical, only the right side path is described herein. Beam 1001 is incident upon right angle beam turning prism 1106 and is reflected to become beam 1002. Beam 1002 then strikes retro-reflector 201 at point $M_1$ and is reflected three times before exiting retro-reflector 201 as beam 1003 at point $Ex_1$. Beam 1003 is reflected a second time by right angle beam turning prism 1106 to become beam 1004, which enters small right angle prism 205. Beam 1004 is then reflected by prism 205 to become beam 1005. Beam 1005 then enters penta-prism 203 inside which it is reflected two times to become beam 1006 and then beam 1007. Beam 1007 leaves penta-prism 203 and is reflected a third time from right angle beam turning prism 1106 as beam 1008. Beam 1008 again strikes retro-reflector 201 at point $M_2$ and is reflected three times before exiting retro-reflector 201 as beam 1009 at point $Ex_2$. Beam 1009 is reflected by right angle beam turning prism 1106 a fourth time to become output beam 1010, which enters beam mixer 215 where it is combined with output beam 1012 from left side 1103 of sense head assembly 1020. Beam mixer 215 provides sine output beam 520 and cosine output beam 522 which are processed as described above to determine the phase relationship between the beams.

The optical path difference OPD between the two sides 1103, 1105 of sense head assembly 102 is given by the equation:

$$OPD = 4 D \sin \theta$$

where D is the distance between the vertices of retro-reflectors 201, 201', and $\theta$ is the angle of rotation of the measurement surface about the line of intersection of the plane of symmetry of the sense head assembly 1020 and the measured axis of rotation of the measurement surface.

This third embodiment has two drawbacks relative to the first two embodiments described above. First, this embodiment requires that the retro-reflectors be attached to the measurement surface. Secondly, this third embodiment does not provide as high resolution, as a result of fewer reflections (two versus four) from the measurement surface (which, in this case, is actually the retro-reflectors which are attached to the measurement surface).

However, this third embodiment provides a significant advantage over the first two embodiments in that it has a much greater working angular range. Furthermore, this embodiment requires fewer optical components than either of the other two.

Detailed Theory of Operation

As a result of the optical properties of retro-reflectors 201 and 201', a beam entering retro-reflector 201 is reflected back toward the source beam in a direction which is essentially parallel to the entering beam, and from a location which is displaced from the source beam. The transmitted and reflected beams stretch or shrink as a result of rotation of the measurement mirror surface on an axis coincident with the plane of symmetry PS of the head assembly. Each of the beams stretch or shrink a distance which is averaged along a line of symmetry originating from the apex of each retro-reflector projected normal to the face (working aperture) of the retro-reflector. An important aspect of the present interferometer system is that the total path length in each side 200, 200' of sense head assembly 200 changes identically from rotational components which are perpendicular to the axis of symmetry of the two sides 200, 200'. That is, any change in path length through one side (for example side 200) due to rotational components which are parallel to a line drawn between the apexes of the two retro-reflectors 210 and 210' is matched identically by the change in path length through the other side (200'). Thus, all rotational components of the measurement surface 103 about an axis that is perpendicular to the plane of symmetry PS are averaged out because the two retro-reflectors "work together" to cancel out the results of any movement of the measurement surface 103 which is orthogonal to the desired plane of measurement. The sense head assembly 102 is therefore sensitive to one axis of rotation of the measurement surface 103 only.

It should be also noted that the optical paths typically employed by prior art interferometer systems for each of the two optical paths are not symmetrical. That is, the two optical paths have different cumulative optical component thicknesses through which each optical path is taken, due to the fact that the beam in one path must pass through a greater length of optical media (i.e., glass) than the beam in the other path. Therefore, the present interferometer system is immune to environmental temperature variations which would adversely affect the accuracy of measurements taken by prior art systems as a result of thermal expansion/contraction of the asymmetrically distributed optical components used by the prior art systems.

The optical properties of the penta-prism/right-angle prism combination 203/205 on the right side optical assembly 200 and the corresponding combination on left side optical assembly 200' produce the effect of canceling any "translation" of the output beams 228, 228' resulting from rotation of the measurement surface in a plane orthogonal to the desired measurement plane. Beam translation can be defined as off-axis reflection of a beam from a measurement surface 103 due to non-parallel alignment between the measurement surface 103 and the reference (bottom) plane of the sense head assembly 102. For the purpose of this document, an "off-axis" beam is a beam whose direction is non-perpendicular to both axes of the reference plane of sense head assembly 102. The reference plane of sense head assembly 102 is the plane defined by the bottom surfaces of quarter wave retardation plates 207, 209, 211, and 213. An off-axis beam in the present system causes a negligible effect on the optical exit point (e.g., the center of the exit wave plate 217 or 218) of the output beam.

The overall effect of the geometry of the optical components of sense head assembly 102 is such that, when looking into a mirror surface being measured, fringe patterns are produced that respond to the optical path difference of the right side optical assembly 200 and left side optical assembly 200'. The optical path of each side 200, 200' changes by a factor of eight times the change in the length of the line projected from the apex of the associated retro-reflector to the measurement surface in a direction normal to the face of the retro-reflector. This factor of eight change in the length of the optical path is due to the optical path is "folded" by the novel arrangement of optics.

The optical path difference OPD between the two sides 200, 200' of sense head assembly 102 is given by the equation:

$$OPD = 8 D \sin \theta$$

where D is the distance between the vertices of retro-reflectors 201, 201', and $\theta$ is the angle of rotation of the mirror surface 103 about the line of intersection of the plane of symmetry PS of the sense head assembly 102 and the measured axis of rotation of the mirror surface 103. It should be noted that the axis of rotation of the mirror surface 103 does not have to be in the plane of the mirror surface 103.

Note that the optical path difference OPD between the two sides 1103, 1105 of sense head assembly 1020 is given by the equation:

$$OPD = 4 D \sin \theta$$

due to the fact that the total optical path length in this embodiment is half the length of the prior embodiments.

Specific Applications

Figure 8:
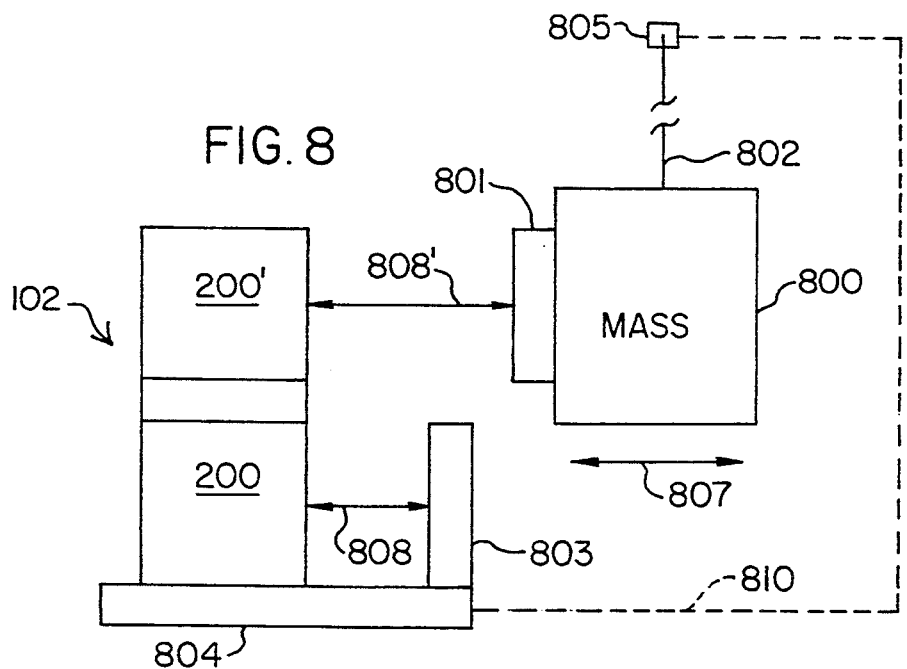
FIGS. 8 and 9 are block diagrams illustrating specific applications employing the present invention.
Figure 9:
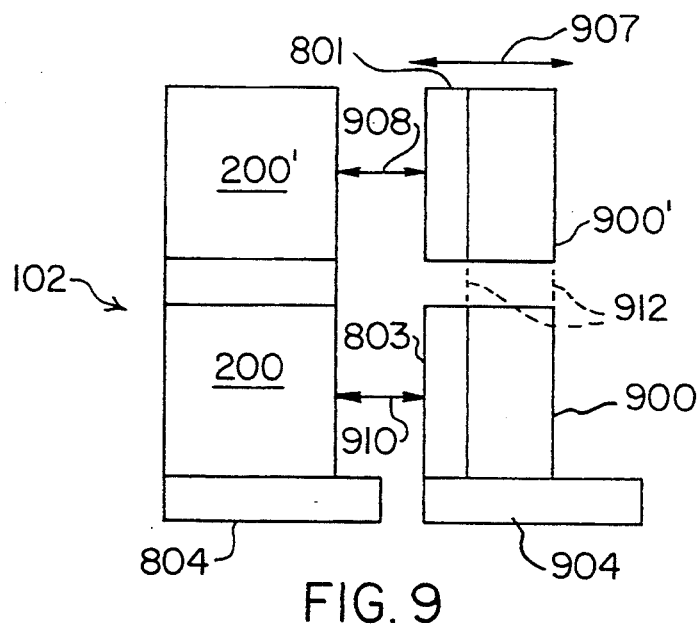

FIGS. 8 and 9 are block diagrams illustrating possible specific applications employing the present invention. FIG. 8 illustrates the interferometer system as used in an accelerometer or a seismometer to detect the motion of a suspended mass. In operation, interferometer sense head assembly 102 is placed on stationary base 804. Reference (plane) mirror 803 is mounted on base 804 at a fixed distance 808 from sense head assembly right side 200. Mass 880, whose differential movement relative to reference mirror 803 is to be measured, is suspended from line 802, which is attached to attachment point 805. Line 802 can be any non-rigid connection means such as a wire or cord. Measurement mirror 801 is attached to mass 800 at a distance from left side sense assembly 200' represented by arrow 808'. Movement of mass 800 along direction 807 is detected by the interferometer sense head assembly 102 as described above.

Dotted line 810 indicates a rigid connection between base 804 and attachment point 805 when the system is to be used as an accelerometer. In such a situation, the instantaneous position of mass 800 (as determined by the relative positions of measurement mirror 801 and reference mirror 803) is used to calculate the acceleration of that mass 800. When the system shown in FIG. 8 is to used as a seismometer, a rigid connection 810 between base 804 and attachment point 805 is optional, that is, the connection 810 may be a non-rigid connection through the earth or other type of indirect or flexible connection.

FIG. 9 illustrates the interferometer system used in a differential linear measurement device. In operation, interferometer sense head assembly 102 is placed on stationary base 804. Reference (plane) mirror 803 is attached to object 900, which is mounted on a separate base 904 located at a distance 910 from sense head assembly right side 200. Measurement mirror 801 is attached to object 900', located at a distance 908 from sense head assembly left side 200'. In certain instances, object 900 and object 900' may in fact be the same object, as indicated by dotted lines 912. In such a situation, the present interferometer system could function as a strain gauge, for example. Differential movement of object 900' along line 907 relative to object 900 is detected by the interferometer sense head assembly 102 as described above.

Other specific applications of the present interferometer system include:

(1) modal analysis, wherein multiple sensor heads are used in conjunction with target mirrors to measure the dynamic behavior of structures;

(2) direct writing applications in integrated circuit fabrication;

(3) topography mapping;

(4) attitude sensing and position control of satellites; and (5) optical shaft angle encoding, where a mirror is attached parallel to the shaft whose angular position is to be measured.

A transmitting/reflecting assembly—mid-path assembly—retro-reflector combination (which is a subassembly of the above-described embodiments) may also be employed to provide a folded optical path in other types of optical instruments as well. An example of such a subassembly might comprise elements 207, 209, 211, 213, 319, 321, 323, 325, 203, 205, and 201, as shown in FIGS. 2, 3, and 4.

It is to be expressly understood that the claimed invention is not to be limited to the description of the preferred embodiment but encompasses other modifications and alterations within the scope and spirit of the inventive concept.

I claim:

1. An interferometer system for differentially measuring an angle between a reference plane and a measurement surface, said interferometer system comprising:
   (a) means for splitting a polarized input light beam into two secondary beams, each of which functions as a measurement beam;
   (b) a first optical assembly optically coupled to said splitting means for receiving a first one of said two secondary beams to produce a first output beam;
   (c) a second optical assembly optically coupled to said splitting means for receiving the other one of said two secondary beams to produce a second output beam;
   (d) wherein said first optical assembly and said second optical assembly each includes:
      (1) transmitting/reflecting means for transmitting said measurement beam incident thereon from a first direction and for reflecting said measurement beam incident thereon from a second direction, wherein said first direction and said second direction are mutually perpendicular;
      (2) mid-path assembly means optically coupled to said transmitting/reflecting means, for canceling out translation of said measurement beam;
      (3) retro-reflector means optically coupled to said transmitting/reflecting means for providing a reflected said measurement beam which is parallel to and displaced from an incident said measurement beam; and
   (e) beam mixer means optically coupled to said first output beam and to said second output beam for generating interference fringes for determining said angle by receiving said first output beam and said second output beam.

2. The interferometer system of claim 1, wherein said transmitting/reflecting means comprises four separate elements to increase the angular working range of said interferometer system.

3. The interferometer system of claim 1, wherein said transmitting/reflecting means comprises a polarizing beam splitter optically coupled to a quarter wave retardation plate.

4. The interferometer system of claim 1, wherein said measurement beam is reflected a total of four times from said measurement surface, each of said four times from and back toward said transmitting/reflecting means.

5. The interferometer system of claim 1, wherein said measurement beam in said first optical assembly and said measurement beam in said second optical assembly are averaged around a line of symmetry having an equal angle relative to each face of the retro-reflector means to cancel out rotational components of the measurement surface about an axis that is perpendicular to a plane of symmetry between the first optical assembly and the second optical assembly.

6. The interferometer system of claim 1, wherein said mid-path assembly means provides a reflected said measurement beam which is displaced from a said incident said measurement beam.

7. The interferometer system of claim 1, wherein said system is used as an accelerometer to measure a differential distance between said reference plane and said measurement surface, and wherein:
   (a) said measurement surface is freely suspended from an attachment point via a non-rigid line;
   (b) said reference plane is located a fixed distance from said first optical assembly and said second optical assembly; and
   (c) said reference plane is fixedly connected to said attachment point.

8. The interferometer system of claim 7, wherein said system is used as a seismometer, and wherein said reference plane is non-rigidly connected to said attachment point.

9. The interferometer system of claim 1, wherein said system is used as measuring device to measure a differential distance between said reference plane and said measurement surface, and wherein said measurement surface and said reference plane are both located at a variable distance from said first optical assembly and said second optical assembly, respectively.

10. An interferometer system for differentially measuring an angle between a reference plane and a measurement surface, said interferometer system comprising:
   (a) means for splitting a polarized input light beam into two secondary beams, each of which functions as a measurement beam;
   (b) a first optical assembly optically coupled to said splitting means for receiving a first one of said two secondary beams to produce a first output beam;
   (c) a second optical assembly optically coupled to said splitting means for receiving the other one of said two secondary beams to produce a second output beam;
   (d) wherein said first optical assembly and said second optical assembly each includes:
      (1) first, second, third and fourth transmitting/reflecting means, each of which operates independently for transmitting said measurement beam incident thereon from a first direction and for reflecting said measurement beam incident thereon from a second direction, wherein said first direction and said second direction are mutually perpendicular;
      (2) mid-path assembly means optically coupled between said second and third transmitting/reflecting means, including a penta-prism and a right angle prism in combination, for canceling out translation of said measurement beam;
      (3) a retro-reflector optically coupled to said first, second, third and fourth transmitting/reflecting means for providing a reflected said measurement beam which is parallel to and displaced from an incident said measurement beam; and
   (e) beam mixer means optically coupled to said first output beam and to said second output beam for generating interference fringes for determining said angle by receiving said first output beam and said second output beam.

11. The interferometer system of claim 10, wherein said measurement beam in said first optical assembly and said measurement beam in said second optical assembly are averaged around a line of symmetry having an equal angle relative to each face of the retro-reflector means to cancel out rotational components of the measurement surface about an axis that is perpendicular to a plane of symmetry between the first optical assembly and the second optical assembly.

12. The interferometer system of claim 10, wherein said beam mixer means includes output beam polarization means for imparting a polarization characteristic to said measurement beam for generating said interference fringes.

13. The interferometer system of claim 10, wherein said transmitting/reflecting means comprises a polarizing beam splitter optically coupled to a quarter wave retardation plate.

14. The interferometer system of claim 10, wherein:
   (a) said measurement beam is reflected a total of four times from said measurement surface, each of said four times from and back toward a different one of said transmitting/reflecting means;
   (b) said measurement beam is reflected by said first and third transmitting/reflecting means toward and back from said measurement surface and then transmitted through said first and second transmitting/reflecting means, respectively, into said retro-reflector; and
   (c) said measurement beam is reflected from said retro-reflector and transmitted through said second and fourth transmitting/reflecting means toward and back from said measurement surface and then reflected by said second and fourth transmitting/reflecting means, respectively, to provide said output beam.

15. An interferometer system for differentially measuring an angle between a reference plane and a measurement surface, said interferometer system comprising:
   (a) means for splitting a polarized input light beam into two secondary beams;
   (b) a pair of optical assemblies optically coupled to said splitting means, each of said optical assemblies being operative with one of said two secondary beams to provide a measurement beam, each of said pair of optical assemblies further comprising:
      (1) transmitting/reflecting means for transmitting said measurement beam incident thereon from a first direction and for reflecting said measurement beam incident thereon from a second direction, wherein said first and said second directions are mutually perpendicular;
      (2) mid-path assembly means optically coupled to said transmitting/reflecting means, including a penta-prism and a right angle prism in combination, for canceling out any translation of said measurement beam;
      (3) a retro-reflector optically coupled to said transmitting/reflecting means for providing a reflected said measurement beam which is parallel to and displaced from an incident said measurement beam;

(4) wherein said measurement beam enters one of said pair of optical assemblies via said transmitting/reflecting means;

(5) wherein said measurement beam is reflected from said measurement surface a first time after being reflected by said transmitting/reflecting means;

(6) wherein said measurement beam is reflected from said retro-reflector and then reflected by said transmitting/reflecting means to be reflected from said measurement surface a second time;

(7) wherein said measurement beam is transmitted through said mid-path assembly and then reflected by said transmitting/reflecting means to be reflected from said measurement surface a third time;

(8) wherein said measurement beam is reflected from said retro-reflector and then transmitted through said transmitting/reflecting means to be reflected from said measurement surface a fourth time to provide an output beam;

(d) wherein each one of said pair of optical assemblies is operative with a different one of said two secondary beams; and (e) beam mixer means optically coupled to said output beam for generating interference information for determining said angle by intersecting said two secondary beams after having been operated upon by said pair of optical assemblies.

16. The system of claim 15, wherein said beam mixer means includes separate means for applying a different polarization to each of said two secondary beams to generate said interference information.

17. The system of claim 15, wherein said transmitting/reflecting means comprises a polarizing beam splitter optically coupled to a quarter wave retardation plate.

18. An interferometer system for differentially measuring an angle between a reference plane and a measurement surface, said interferometer system comprising:

(a) beam splitter means for splitting a polarized input light beam into two secondary beams, each of which functions as a measurement beam;

(b) a first optical assembly optically coupled to said splitting means for receiving a first one of said two secondary beams to produce a first output beam;

(c) a second optical assembly optically coupled to said splitting means for receiving the other one of said two secondary beams to produce a second output beam;

(d) wherein said first optical assembly and said second optical assembly each includes:

(1) mid-path assembly means optically coupled to said beam splitter means for canceling out translation of said measurement beam;

(2) retro-reflector means optically coupled to said mid-path assembly means, and attached to said measurement surface, for providing a reflected said measurement beam which is parallel to and displaced from an incident said measurement beam; and (3) right angle beam turning prism means optically coupled between said mid-path assembly means and said retro-reflector means for reflecting incident light at a right angle; and (e) beam mixer means optically coupled to said first output beam and to said second output beam for generating interference fringes for determining said angle by intersecting said first output beam and said second output beam.

19. The interferometer system of claim 18, wherein said mid-path assembly includes a penta-prism optically coupled to a right angle prism.

20. The interferometer system of claim 18, wherein said measurement beam in said first optical assembly and said measurement beam in said second optical assembly are averaged around a line of symmetry having an equal angle relative to each face of the retro-reflector means to cancel out rotational components of the measurement surface about an axis that is perpendicular to a plane of symmetry between the first optical assembly and the second optical assembly.

21. A laser interferometer system for differentially measuring an angle between a reference plane and a measurement surface, said system comprising:

(a) initial splitting means for splitting a laser input beam into two secondary beams;

(b) output beam splitter means for causing two intersected said secondary beams to generate interference information for calculating said angle;

(c) a pair of optical assemblies, each of which is optically coupled to said initial splitting means and which further comprises:

a first, a second, a third, and a fourth polarizing beam splitter, each of which is operable independently to transmit light which polarized in a first orientation and reflect light which is polarized in a second orientation perpendicular to said first orientation;

first, second, third, fourth, and fifth polarization means, each of which is operable independently to polarize light passing therethrough;

a penta-prism optically coupled to a right angle prism; and a retro-reflector;

(d) wherein the polarization imparted by said fifth polarization means in a first one of said pair of optical assemblies is substantially different from the polarization imparted by said fifth polarization means in the second one of said pair of optical assemblies;

(e) wherein each one of said pair of optical assemblies is operative with a different one of said two secondary beams; and (f) wherein each one of said two secondary beams travels through a corresponding one of said pair of optical assemblies from said first polarizing beam splitter through said first polarization means to said measurement surface and back through said first polarization means and is then reflected by said first polarizing beam splitter toward said retro-reflector, is reflected therefrom through said second polarizing beam splitter and through said second polarization means to said measurement surface and back through said second polarization means and is then reflected by said second polarizing beam splitter toward and through said penta-prism and through said right angle prism, and then is reflected by said third polarizing beam splitter through said third polarization means to said measurement surface and back through said third polarization means and then passes through said third polarizing beam splitter toward said retro-reflector, is reflected therefrom through said fourth polarizing beam splitter and through said fourth polarization means to said measurement surface and back through said fourth polarization means and then reflected by said fourth polarizing beam splitter toward and through said fifth polarization means into said output beam splitter means, 22. The system of claim 21, wherein:

said first, said second, said third, and said fourth polarizing beam splitter each have a vertical edge disposed in abutting relation to one another;

said first, said second, said third, and said fourth polarization means are disposed in abutting relation to a bottom side of said first, said second, said third, and said fourth polarizing beam splitter, respectively;

said penta-prism is disposed in abutting relation to a given one of said polarization means, and said right angle prism is disposed in abutting relation to both an adjacent one of said polarization means and also to said penta-prism;

said retro-reflector is disposed in abutting relation above said first, said second, said third, and said fourth polarizing beam splitters; and said fifth polarization means is disposed on an outside surface of one of said polarizing beam splitters.

23. The system of claim 21, wherein each of said first polarization means, said second polarization means, said third polarization means, and said fourth polarization means comprises a quarter wave retardation plate.

24. The system of claim 21, wherein said fifth polarization means comprises a quarter wave retardation plate in a first one of said pair of optical assemblies, and a half wave retardation plate in the second one of said pair of optical assemblies.

25. A laser interferometer system for differentially measuring an angle between a reference plane and a measurement surface, said system comprising:

(a) means for splitting a linearly polarized laser input beam into two linearly polarized secondary beams;

(b) a pair of optical assemblies, each of which is optically coupled to said initial splitting means and which further comprises:

a first, a second, a third, and a fourth polarizing beam splitter, each of which is operable independently to transmit light which polarized in a first orientation and reflect light which is polarized in a second orientation perpendicular to said first orientation;

first, second, third, fourth, and fifth polarization means, each of which is operable independently to polarize light passing therethrough;

a penta-prism optically coupled to a right angle prism;

a retro-reflector;

a penta-prism optically coupled to a right angle prism;

wherein said first polarizing beam splitter reflects one of said two linearly polarized secondary beams towards said measurement surface to create a measurement beam;

wherein said first polarization means is optically coupled between said first polarizing beam splitter and said measurement surface;

wherein said measurement beam is transmitted through said first polarization means toward said measurement surface;

wherein said measurement beam is reflected from said measurement surface;

wherein said measurement beam is transmitted back through said first polarization means;

wherein said measurement beam is transmitted through said first polarizing beam splitter toward said retro-reflector;

wherein said measurement beam is reflected by said retro-reflector;

wherein said measurement beam is transmitted through said second polarizing beam splitter and second polarization means toward said measurement surface and back to said second polarizing beam splitter;

wherein said second polarizing beam splitter reflects said measurement beam towards said penta-prism and through said penta-prism and said right angle prism;

wherein said measurement beam is reflected by said third polarizing beam splitter through said third polarization means to said measurement surface and back through said third polarization means;

wherein said measurement beam passes through said third polarizing beam splitter toward said retro-reflector and is reflected towards said fourth polarizing beam splitter;

wherein said measurement beam is transmitted through said fourth polarization means toward said measurement surface and reflected back through said fourth polarization means;

wherein said measurement beam is reflected by said fourth polarizing beam splitter toward and through said fifth polarization means into said output beam splitter means;

(c) wherein said fifth polarization means in a first one of said pair of optical assemblies imparts a first polarization to a first said measurement beam and said fifth polarization means in the second one of said pair of optical assemblies imparts a second polarization to a second said measurement beam;

(d) wherein each one of said pair of optical assemblies is operative with a different one of said two linearly polarized secondary beams; and (e) output beam splitter means for generating interference information by intersecting said first measurement beam and said second measurement beam.

26. The system of claim 25, wherein each of said first polarization means, said second polarization means, said third polarization means, and said fourth polarization means comprises a quarter wave retardation plate.

27. The system of claim 25, wherein said fifth polarization means comprises a quarter wave retardation plate in a first one of said pair of optical assemblies, and a half wave retardation plate in the other one of said pair of optical assemblies.

28. An interferometer system for differentially measuring an angle between a reference plane and a measurement surface, said interferometer system comprising:

(a) means for splitting a polarized input light beam into two secondary beams;

(b) a pair of optical assemblies, each of which is optically coupled to one of said two secondary beams to provide a measurement beam, each of said pair of optical assemblies further comprising:

(1) four transmitting/reflecting means, each of which operates independently for transmitting said measurement beam incident thereon from a first direction and for reflecting said measurement beam incident thereon from a second direction, wherein said first and said second directions are mutually perpendicular;

(2) mid-path assembly means optically coupled to each of said transmitting/reflecting means, including a penta-prism and a right angle prism in combination, for canceling out any translation of said measurement beam;

(3) a retro-reflector optically coupled to each of said transmitting/reflecting means;

(4) wherein said measurement beam enters one of said pair of optical assemblies via a first one of said transmitting/reflecting means;

(5) wherein said measurement beam is reflected from said measurement surface a first time after being reflected by said first one of said transmitting/reflecting means;

(6) wherein said measurement beam is reflected from said retro-reflector and then reflected by a second one of said transmitting/reflecting means to be reflected from said measurement surface a second time;

(7) wherein said measurement beam is transmitted through said mid-path assembly and then reflected by a third one of said transmitting/reflecting means to be reflected from said measurement surface a third time;

(8) wherein said measurement beam is reflected from said retro-reflector and then transmitted through a fourth one of said transmitting/reflecting means to be reflected from said measurement surface a fourth time to provide an output beam;

(d) wherein each one of said pair of optical assemblies is operative with a different one of said two secondary beams; and (e) beam mixer means operative with said output beam for generating interference information for determining said angle by intersecting said two secondary beams after having been operated upon by said pair of optical assemblies.

29. The system of claim 28, wherein said beam mixer means includes separate means for applying a different polarization to each of said two secondary beams to generate said interference information.

30. The system of claim 28, wherein said transmitting/reflecting means comprises a polarizing beam splitter optically coupled to a quarter wave retardation plate.

31. An improved method of providing a folded optical path in an optical instrument, said method comprising the steps of:

(a) providing a transmitting/reflecting means for transmitting said measurement beam incident thereon from a first direction and for reflecting said measurement beam incident thereon from a second direction, wherein said first direction and said second direction are mutually perpendicular;

(b) providing mid-path assembly means for canceling out translation of said measurement beam;

(c) providing retro-reflector means for reflecting an incident said measurement beam which is displaced in a direction perpendicular to that of said incident measurement beam; and (d) optically coupling said mid-path assembly means between said transmitting/reflecting means and said retro-reflector means.

32. The method of claim 31, wherein four of said transmitting/reflecting means are provided to increase the angular working range of said method.

* * * * *